United States Patent
Zhou

(10) Patent No.: US 10,484,123 B2
(45) Date of Patent: *Nov. 19, 2019

(54) APPARATUS AND METHOD FOR DISTRIBUTED COMPENSATION OF NARROW OPTICAL FILTERING EFFECTS IN AN OPTICAL NETWORK

(71) Applicant: AT&T Intellectual Property I, L.P., Atlanta, GA (US)

(72) Inventor: Xiang Zhou, Sunnyvale, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,353

(22) Filed: Sep. 21, 2018

(65) Prior Publication Data

US 2019/0028227 A1 Jan. 24, 2019

Related U.S. Application Data

(63) Continuation of application No. 15/233,434, filed on Aug. 10, 2016, now Pat. No. 10,116,408, which is a continuation of application No. 13/310,367, filed on Dec. 2, 2011, now Pat. No. 9,450,697.

(51) Int. Cl.
  *H04B 10/67* (2013.01)
  *H04J 14/02* (2006.01)
(52) U.S. Cl.
  CPC ...... *H04J 14/0212* (2013.01); *H04J 14/0221* (2013.01)

(58) Field of Classification Search
  CPC .................... H04J 14/0212; H04J 14/0221
  See application file for complete search history.

(56) References Cited

U.S. PATENT DOCUMENTS

| | | |
|---|---|---|
| 6,449,402 B1 | 9/2002 | Bettman et al. |
| 6,810,169 B2 | 10/2004 | Bouevitch |
| 6,961,524 B1 | 11/2005 | Foo |
| 7,248,695 B1 | 7/2007 | Beal et al. |
| 7,751,714 B2 | 7/2010 | Zhong et al. |
| 9,450,697 B2 * | 9/2016 | Zhou .................. H04J 14/0221 |
| 10,116,408 B2 * | 10/2018 | Zhou .................. H04J 14/0221 |
| 2002/0154359 A1 | 10/2002 | Tsuda et al. |
| 2002/0172458 A1 | 11/2002 | Downie |
| 2003/0011769 A1 | 1/2003 | Rakuljic et al. |
| 2003/0025956 A1 | 2/2003 | Li et al. |

(Continued)

OTHER PUBLICATIONS

Infocellar; ROADM Reconfigurable Optical ADM (Add-Drop Multiplexers); http://www.infocellar.com/networks/new-tech/ROADM/ROADM.htm; downloaded Oct. 11, 2011; pp. 1-4.

(Continued)

*Primary Examiner* — Shi K Li
(74) *Attorney, Agent, or Firm* — Chiesa Shahinian & Giantomasi PC

(57) ABSTRACT

The present disclosure describes a reconfigurable optical add-drop multiplexer including a wavelength selective switch configured to filter wavelengths of an optical signal; and an optical equalizer, coupled to the wavelength selective switch, configured to equalize the optical signal to mitigate optical filtering effects caused by the wavelength selective switch.

20 Claims, 14 Drawing Sheets

(56) References Cited

U.S. PATENT DOCUMENTS

| | | |
|---|---|---|
| 2006/0067701 A1 | 3/2006 | Nakamoto et al. |
| 2006/0171717 A1 | 8/2006 | Kikuchi |
| 2007/0248361 A1 | 10/2007 | Nakamura et al. |
| 2009/0028576 A1 | 1/2009 | Elahmadi et al. |
| 2010/0183310 A1 | 7/2010 | Suzuki et al. |
| 2010/0329686 A1 | 12/2010 | Frankel |
| 2012/0087658 A1 | 4/2012 | Jander |

OTHER PUBLICATIONS

Wikipedia; Optical Add-Drop Multiplexer; http://en.wikipedia.org/wiki/Optical_add-drop_multiplexer; downloaded Oct. 11, 2011; p. 1-2.
Wikipedia; Reconfigurable Optical Add-Drop Multiplexer; http://en.wikipedia.org/wiki/Reconfigurable_optical_add-drop_multiplexer; downloaded Oct. 11, 2011; p. 1.
Wikipedia; ROADM (Reconfigurable Optical Add-Drop Multiplexer); http://searchtelecom.techtarget.com/definition/ROADM-reconfigurable_optical-add-drop; downloaded Oct. 11, 2011; pp. 1-3.
U.S. Appl. No. 15/233,434, filed Aug. 10, 2016.
U.S. Appl. No. 13/310,367, filed Dec. 2, 2011.

\* cited by examiner

APPARATUS AND METHOD FOR DISTRIBUTED COMPENSATION OF NARROW OPTICAL FILTERING EFFECTS IN AN OPTICAL NETWORK

This application is a continuation of prior U.S. patent application Ser. No. 15/233,434 filed Aug. 10, 2016, which is a continuation of prior U.S. patent application Ser. No. 13/310,367 filed Dec. 2, 2011 and issued as U.S. Pat. No. 9,450,697 on Sep. 20, 2016, the disclosures of which are incorporated herein by reference in their entirety.

FIELD OF THE INVENTION

The present application relates to using reconfigurable optical add/drop multiplexers (ROADMs) to route optical wavelengths of optical signals.

BACKGROUND OF THE INVENTION

Optical networks using ROADMs for routing optical wavelengths are becoming increasingly prevalent resulting from the need for lower costs, greater flexibility between data formats, and efficient capacity upgrades. In optical networks, the achievable spectral efficiency (SE) and overall fiber capacity are limited by noise from optical amplifiers and fiber nonlinearity. The SE and overall fiber capacity are also limited by channel narrowing caused by the usage of wavelength selective devices or wavelength selective switches (WSS), which are components of ROADMs.

For example, in 50 Ghz-spaced 40-Gb/s and 100-GB/s wavelength-division-multiplexed (WDM) systems, channel bandwidth narrowing effects are managed by using digital coherent detection and bandwidth improvement of wavelength selective devices. However, even with combined use of digital coherent detection and improved flat-top wavelength selective devices, the usable bandwidth for a typical long-haul optical network is still limited to 30-40 GHz for a 50 Ghz-spaced WDM system. Although this channel bandwidth supports 100 Gb/s systems over 50 GHz WDM grid by using polarization-multiplexed (PM) quadrature phase shift keying (QPSK) modulation, it is not wide enough to support future 400 Gb/s and beyond systems operating at higher spectral efficiency by using high-order quadrature amplitude modulation (QAM) based modulation formats.

Improvements to spectral utilization in WDM systems have been proposed. A first method is based on the concept of using a super channel where the channel grid is increased in order to reduce the portion of channel guard bands to improve spectral utilization. However, usage of the super channel reduces channel granularity, and thus reduces network efficiency and flexibility. A second method is based on using transmitter side pre-equalization, where the spectral shape of a transmitted signal is pre-emphasized in order to combat cascaded optical filtering along optical links. However, because the narrow optical filtering effects occur in a distributed way along each optical link, the pre-equalized signal will have a higher launch power and as a result experience more nonlinear impairments. A third method utilized advanced post equalization techniques such as maximum likelihood sequence equalization (MLSE) to perform post-transmission equalization of filtering effects. However, this method does not perform well when the signal-to-noise ratio is low, which is typical for high-speed systems using advanced feed-forward error correction coding.

SUMMARY OF THE INVENTION

The present disclosure describes a reconfigurable optical add-drop multiplexer including a wavelength selective switch configured to filter wavelengths of an optical signal; and an optical equalizer, coupled to the wavelength selective switch, configured to equalize the optical signal to mitigate optical filtering effects caused by the wavelength selective switch.

In an embodiment, the optical equalizer is configured to pre-equalize the optical signal to generate an equalized optical signal to transmit to the wavelength selective switch. The wavelength selective switch may include an add port coupled to the optical equalizer, the add port configured to receive the equalized optical signal from the optical equalizer.

In an embodiment, the optical equalizer is configured to post-equalize an optical signal filtered by the wavelength selective switch. The wavelength selective switch may include a drop port coupled to the optical equalizer, the drop port configured to transmit the optical signal filtered by the wavelength selective switch to the optical equalizer.

In an embodiment, the reconfigurable optical add-drop multiplexer further includes a plurality of wavelength selective switches; and a plurality of optical equalizers coupled to a wavelength selective switch.

In an embodiment, the optical equalizer is liquid crystal on silicon based.

The present disclosure further describes a method of compensation processing of an optical signal by an optical equalizer. In an embodiment, an optical signal is received. The optical signal is equalized to mitigate optical filtering effects of a wavelength selective device to produce an equalized optical signal. The equalized optical signal is transmitted to the wavelength selective device.

In an embodiment, equalizing the optical signal includes adjusting a frequency strength of the optical signal. Distributed optical filtering effects of a plurality of wavelength selective switches may be mitigated along a transmission link. The equalizing may be performed by an optical equalizer, and equalizing the optical signal may include reducing noise degradation of the optical equalizer.

In an embodiment, the equalized optical signal is transmitted to an add port of the wavelength selective device.

In an embodiment, an optical signal is received from a wavelength selective switch. The optical signal is equalized to mitigate optical filtering effects of the wavelength selective device to produce an equalized optical signal.

In an embodiment, the optical signal may be received from a drop port of the wavelength selective device.

These and other advantages of the invention will be apparent to those of ordinary skill in the art by reference to the following detailed description and the accompanying drawings.

DETAILED DESCRIPTION

The method and apparatus described herein addresses the channel narrowing problem described above. Narrow optical filtering effects caused by wavelength selective devices, such as wavelength selective switches (WSS), inside a ROADM, may be mitigated.

A distributed optical filtering effects compensation method and apparatus, described herein, addresses channel narrowing. The embodiments described herein maximize an achievable spectral efficiency (SE), thus improving transport economics. The introduction of an optical equalizer before a WSS pre-equalizes the amplitude of an optical signal received at a ROADM. Alternatively, an optical equalizer may be placed after a WSS to perform post-filtering equalization of an optical signal that has been filtered by a ROADM. The aforementioned optical equalizers may be integrated into a ROADM in an optical network in order to perform distributed optical filtering effects compensation. As a result, the effective channel bandwidth in an optical network can be improved significantly while only introducing minimal nonlinear penalty. Any extra noise penalty caused by the optical equalizers themselves can be managed and minimized through optical amplification.

Figure 1:
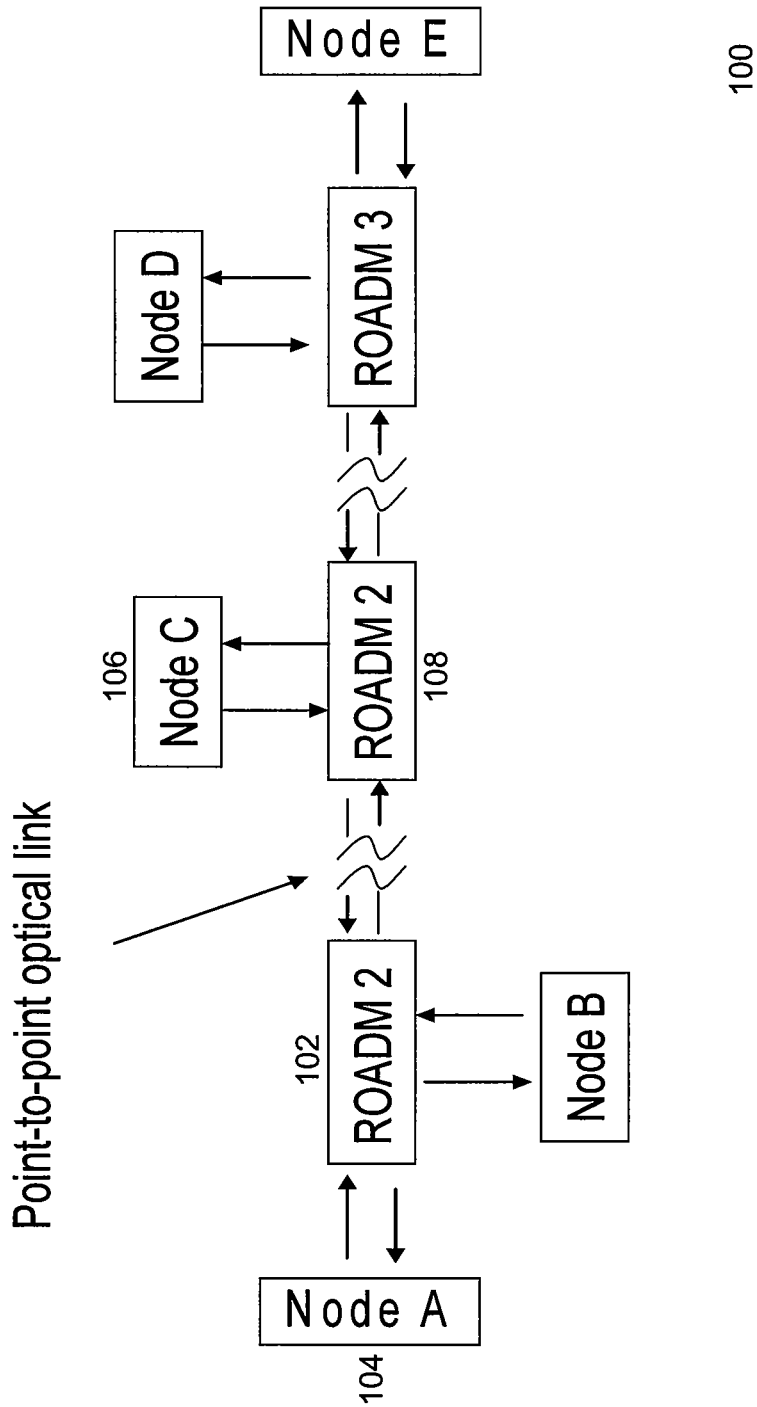
FIG. 1 illustrates an exemplary wavelength-routing optical network.

FIG. 1 illustrates an exemplary wavelength-routing optical network 100. Optical signals may pass from one node to another node through ROADMs via optical links. For example, an optical signal from Node A 104 is transmitted to Node C 106 via ROADM 102 and ROADM 108. Each ROADM includes at least one WSS that is used for filtering wavelengths from the optical signals.

Figure 2:
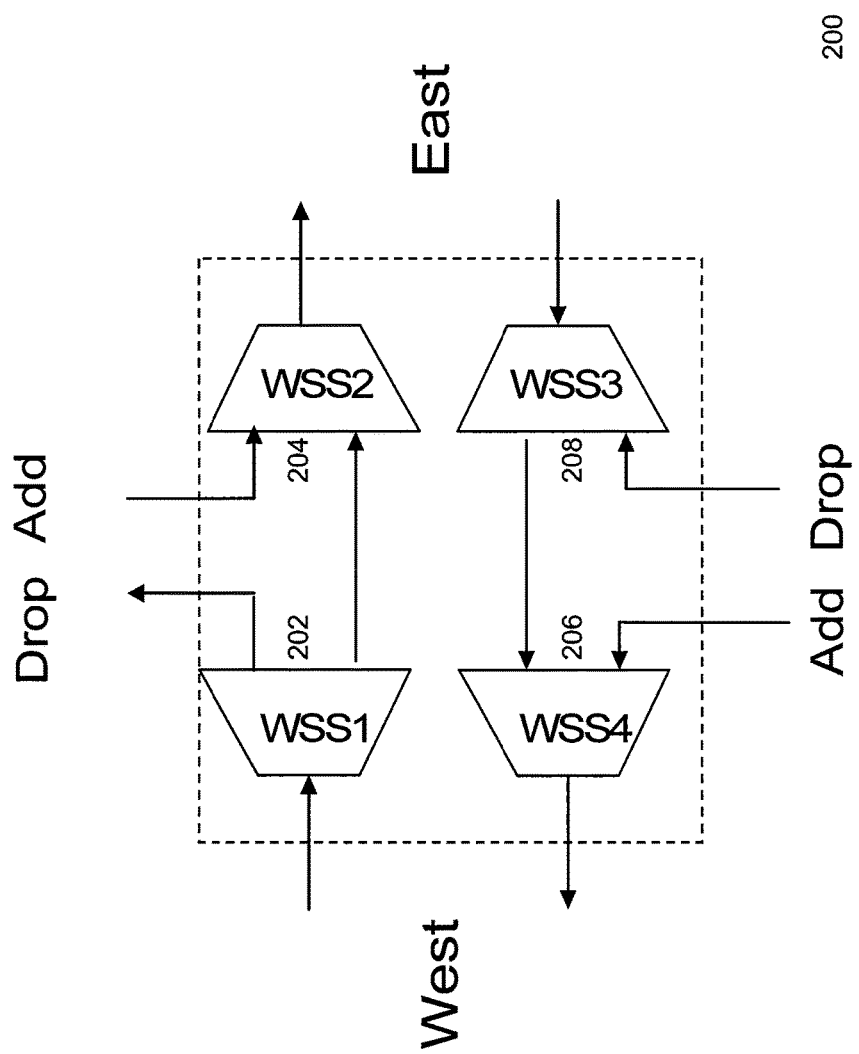
FIG. 2 illustrates an exemplary ROADM.

FIG. 2 illustrates an exemplary ROADM 200. ROADM 200 includes four WSS' 202, 204, 206, and 208. WSS' 202 and 204 propagate optical signals in a first direction. WSS' 206 and 208 propagate signals in a second direction. Each WSS is an optical spectrometer including a switching engine element at the back end. The switching engine element may be based on binary liquid crystals (LC), liquid crystal on silicon (LCoS), or micorelectricalmechanical (MEMs). The spectral shape of any WSS is determined based on the spectral resolution of the ROADM. The spectral resolution can be expressed as a ratio of the distance between the center of adjacent channel switching engine elements in each WSS to a beam spot radius measured at the channel switching engine element. Due to physical size and cost constraints, the 0.5 dB bandwidth of a 50 GHz-grid WSS is typically limited to 30-40 GHz.

Figure 3A:
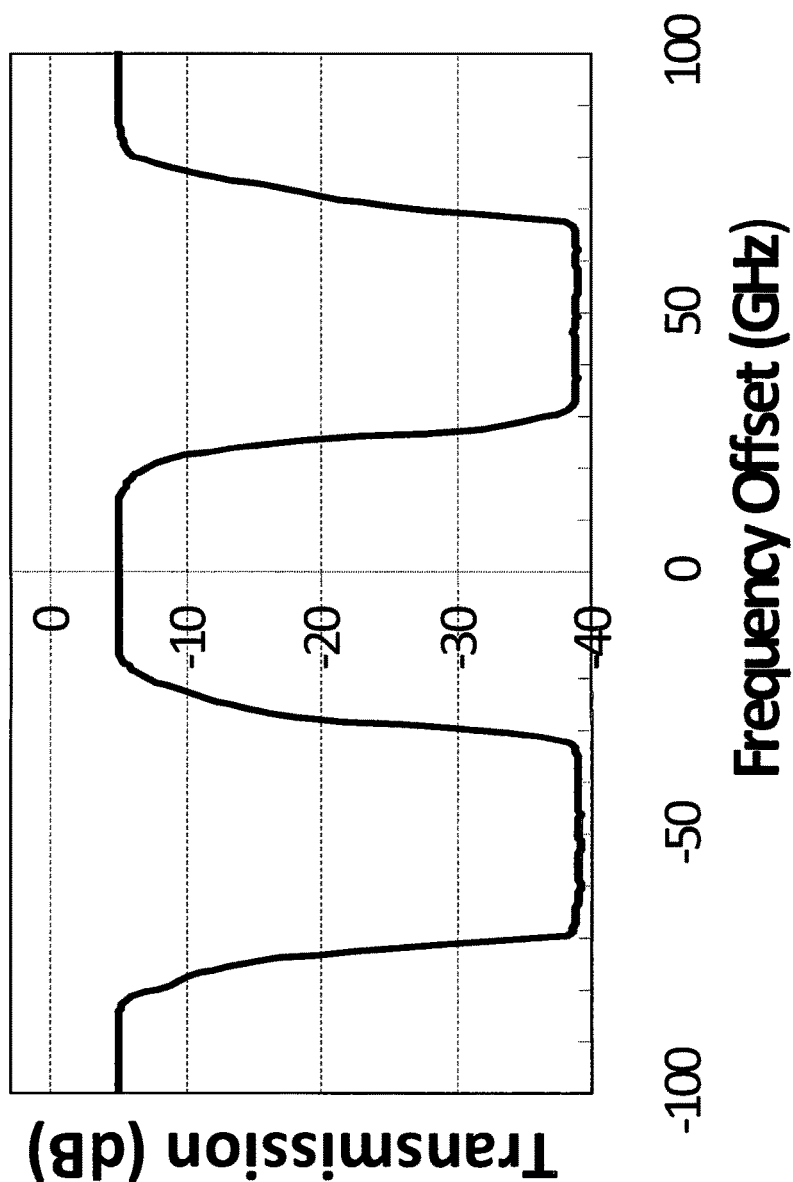
FIG. 3A illustrates a measured power transfer function of a single WSS.

FIG. 3A illustrates a measured power transfer function of a single WSS. Specifically, FIG. 3A illustrates a measured power transfer function for a typical 50 GHz-grid WSS using a binary LC based switching engine element. The 0.5 dB and 3 dB bandwidth is shown by the transfer function as being 33 GHz and 42 GHz, respectively.

Figure 3B:
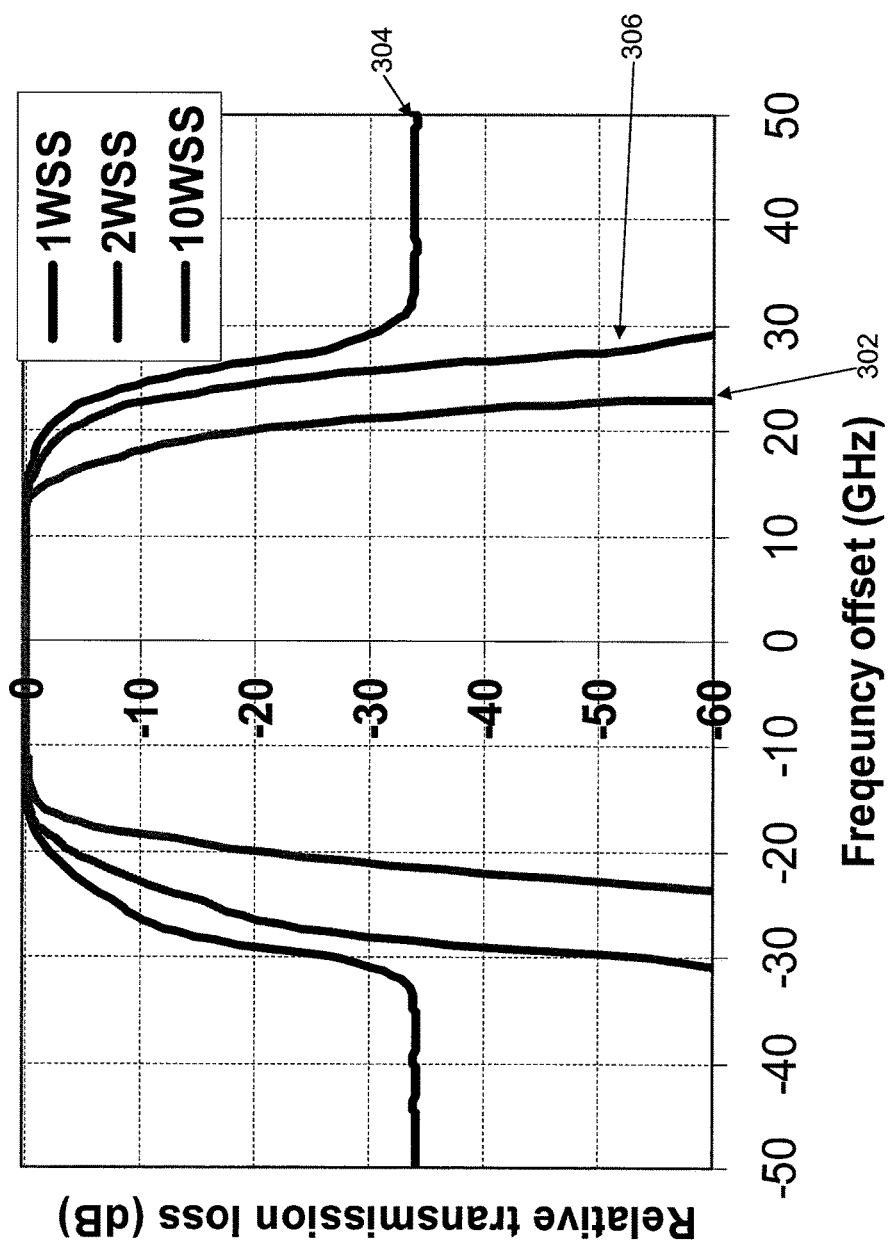
FIG. 3B illustrates a measured power transfer function of a single WSS, two WSS', and a cascade of 10 WSS'.

FIG. 3B illustrates a measured power transfer function of a single WSS, two WSS', and a cascade of 10 WSS'. FIG. 3B illustrates a measured power transfer function 302 for a typical 50 GHz-grid cascade of 10 WSS' using binary LC based switching engine elements. The 0.5 dB and 3 dB bandwidth is shown by the transfer function as being 28 GHz and 31.5 GHz, respectively. FIG. 3B also illustrates a measured power function 304 for a 50 GHz-grid single WSS and measured power function 306 for a 50 GHz-grid two WSS cascade.

Figure 4A:
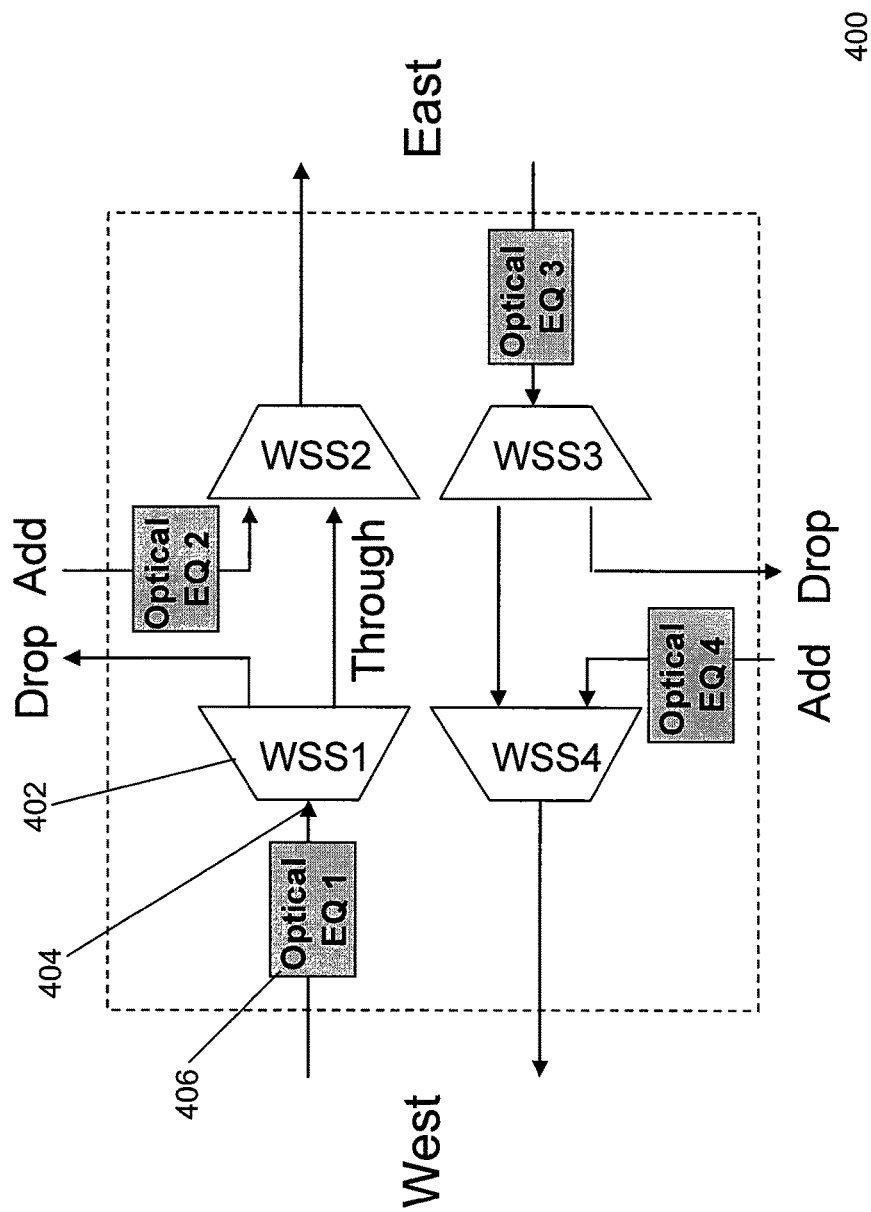
FIG. 4A illustrates an exemplary ROADM including optical equalizers coupled to add ports of WSS' in accordance with an embodiment of the present disclosure.

FIG. 4A illustrates an exemplary ROADM 400 including optical equalizers coupled to add ports of WSS' in accordance with an embodiment of the present disclosure. Each wavelength selective switch is configured to filter wavelengths of a received optical signal. In order to improve channel bandwidth utilization or channel efficiency of each WSS in a ROADM, an optical equalizer may be added to a ROADM and configured such that the optical equalizer receives an optical signal entering an add port of a WSS. For example, ROADM 400 includes WSS 402. WSS 402 includes an add port 404 and a corresponding optical equalizer 406. Placement of optical equalizer 406 at add port 404 of WSS 402 facilitates the pre-equalization of an optical signal before the optical signal is transmitted to WSS 402. Specifically, the spectral shape of the optical signal is pre-equalized or pre-compensated to adjust for filtering effects that may be experienced by different channels of WSS 402. The filtering effects are caused by wavelength routing settings of WSS 402.

The integration of optical equalizer 406 at add port 404 of WSS 402 allows precompensation of the filtering effects to take place within ROADM 400 instead of at an external component. Thus, each optical equalizer 406 precompensates for optical filtering effects caused by each associated WSS 402. Precompensation of optical filtering effects entails equalizing the optical signal to mitigate optical filtering effects caused by the wavelength selective switch. As a result, there is no need to increase the power launching of the optical signal into an optical fiber and thus there is no introduction of any additional nonlinear penalty. Addition of the optical equalizers facilitates distributed precompensation of optical filtering effects throughout an entire transmission link. Any noise degradation caused by the optical equalizers may be managed by using low loss optical equalizers. For example, an LCoS based optical equalizer has a <7 dB insertion loss and is adequate for usage in accordance with the embodiments described herein.

Figure 4B:
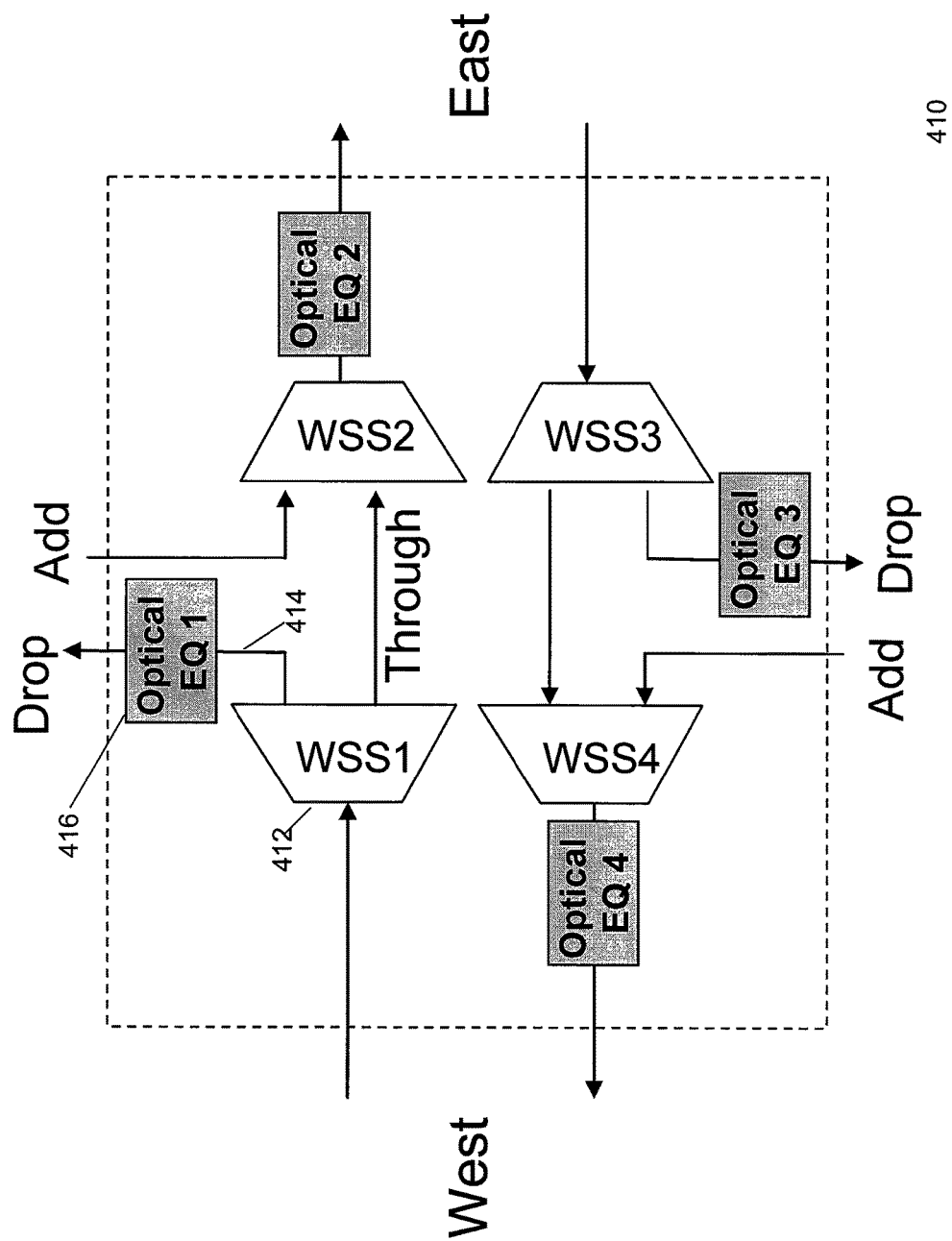
FIG. 4B illustrates an exemplary ROADM including optical equalizers coupled to drop ports of WSS' in accordance with an embodiment of the present disclosure.

FIG. 4B illustrates an exemplary ROADM 410 including optical equalizers coupled to drop ports of WSS' in accordance with an embodiment of the present disclosure. ROADM 410 differs from ROADM 400 illustrated by FIG. 4A, in that ROADM 410 includes optical equalizers integrated at drop ports of WSS'. For example, optical equalizer 416 at drop port 414 of WSS 412 facilitates postcompensation of optical filtering effects caused by the WSS' 412. Thus, optical equalizer 416 postcompensates for optical filtering effects caused by associated WSS 412. Postcompensation, like precompensation, entails equalizing the optical signal to mitigate optical filtering effects caused by the wavelength selective switch.

Figure 4C:
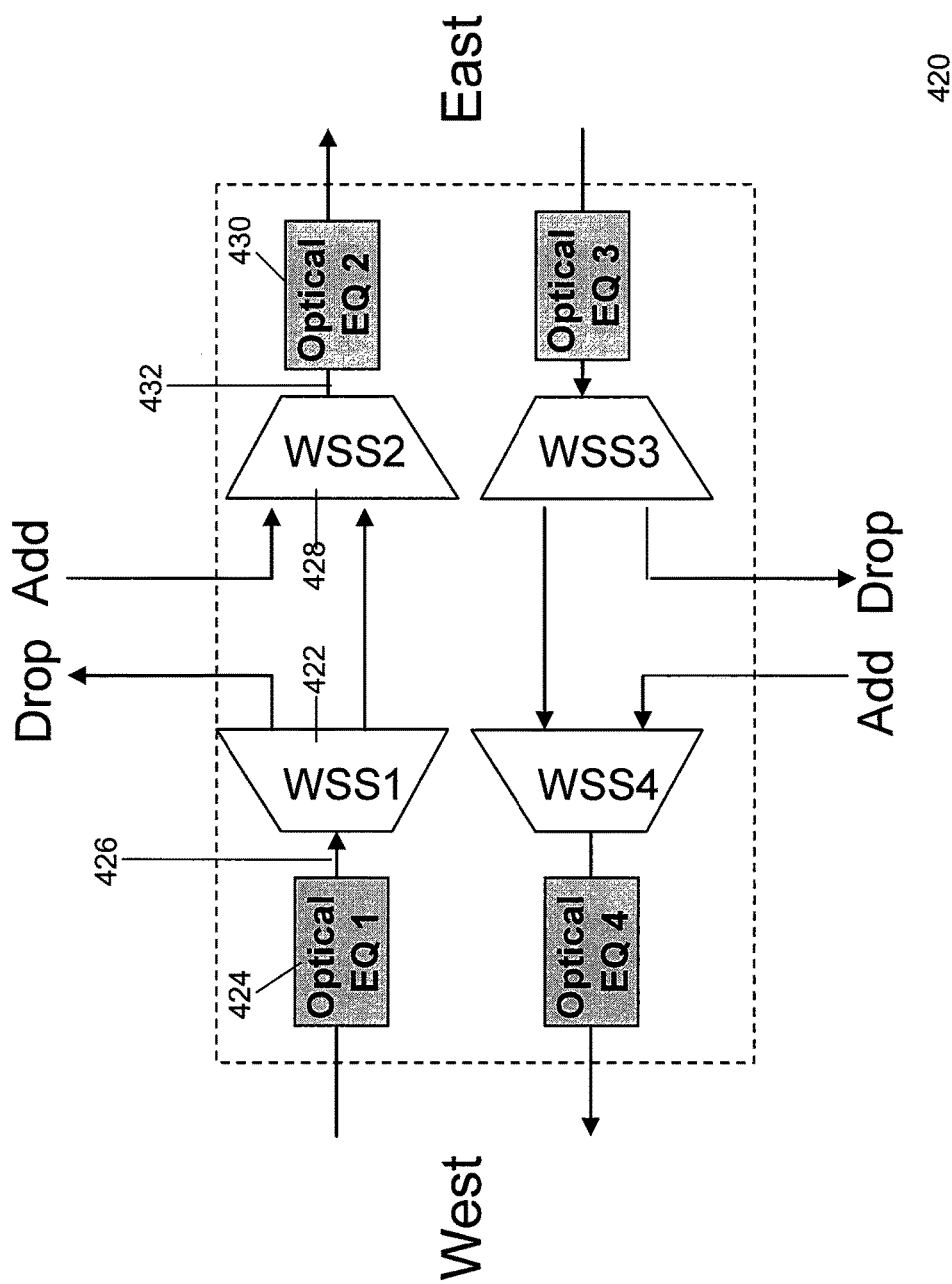
FIG. 4C illustrates an exemplary ROADM including optical equalizers coupled to add ports WSS' and optical equalizers coupled to drop ports of WSS' in accordance with an embodiment of the present disclosure.

FIG. 4C illustrates an exemplary ROADM 420 including optical equalizers coupled to add ports WSS' and optical equalizers coupled to drop ports of WSS' in accordance with an embodiment of the present disclosure. ROADM 420 utilizes optical equalizers at both add ports and drop ports of different WSS'. For example, at WSS 422, optical equalizer 424 may be integrated with add port 426. Thus, optical equalizer 424 precompensates an optical signal for optical filtering effects caused by WSS 422. At WSS 428, optical equalizer 430 may be integrated with drop port 432. Thus, optical equalizer 430 postcompensates an optical signal for optical filtering effects caused by WSS 428. ROADM 420 shows that optical equalizers may be strategically placed at add or drop ports of WSS' in order to takes advantage of both precompensation and postcompensation techniques.

Figure 4D:
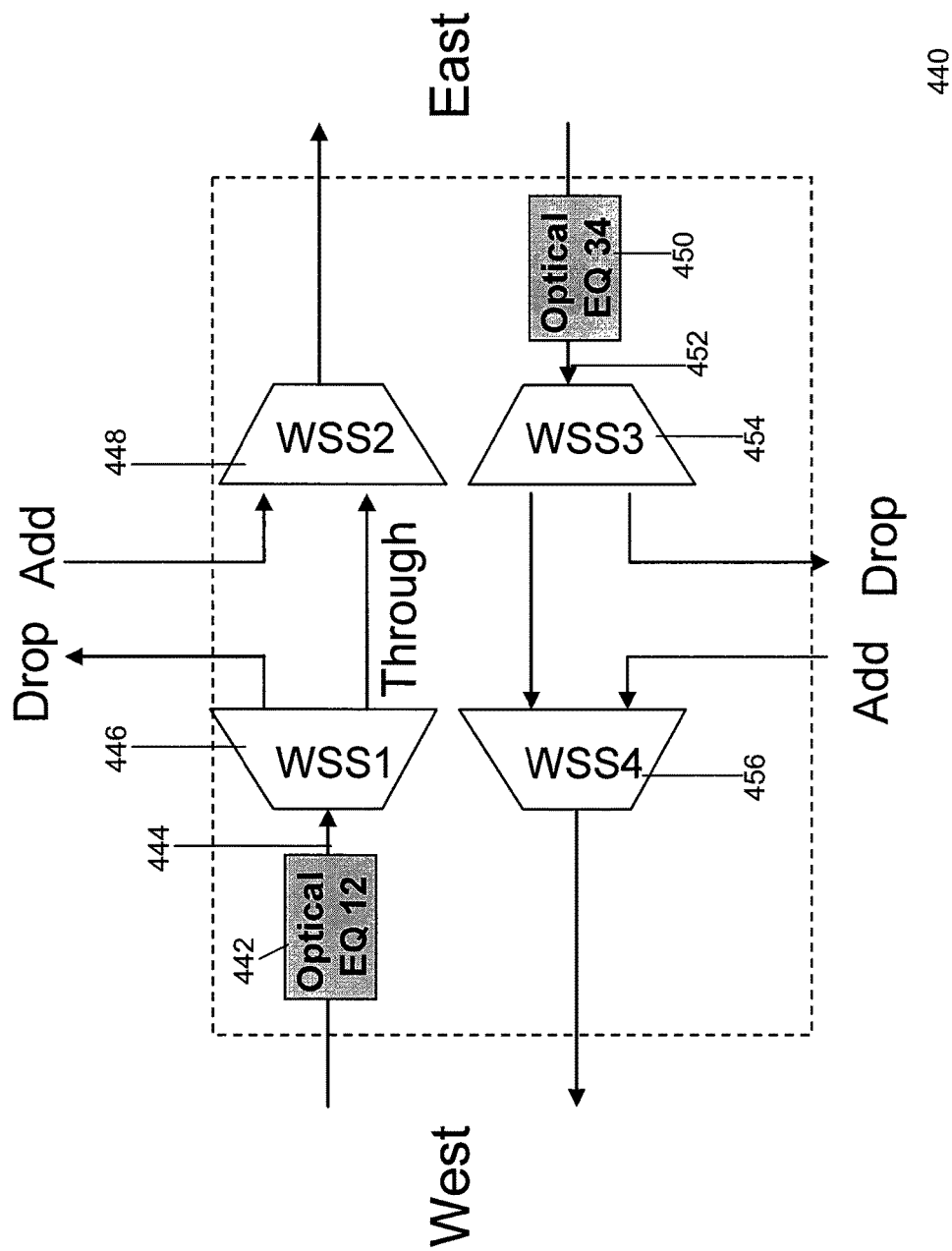
FIG. 4D illustrates an exemplary ROADM including an optical equalizer coupled to a WSS for each propagation direction, in accordance with an embodiment of the present disclosure.

FIG. 4D illustrates an exemplary ROADM 440 including an optical equalizer coupled to a WSS for each propagation direction, in accordance with an embodiment of the present disclosure. ROADM 440 utilizes a single optical equalizer in each propagation direction to compensate for optical filtering effects of more than one WSS. For example, optical equalizer 442 is placed at add port 444 of WSS 446. Optical equalizer 442 may be configured to not only precompensate for optical filtering effects of WSS 446, but also of WSS 448. Likewise, in a different propagation direction, optical equalizer 450, placed at add port 452 of WSS 454 may precompensate for optical filtering effects of both WSS 454 and WSS 456.

Figure 4E:
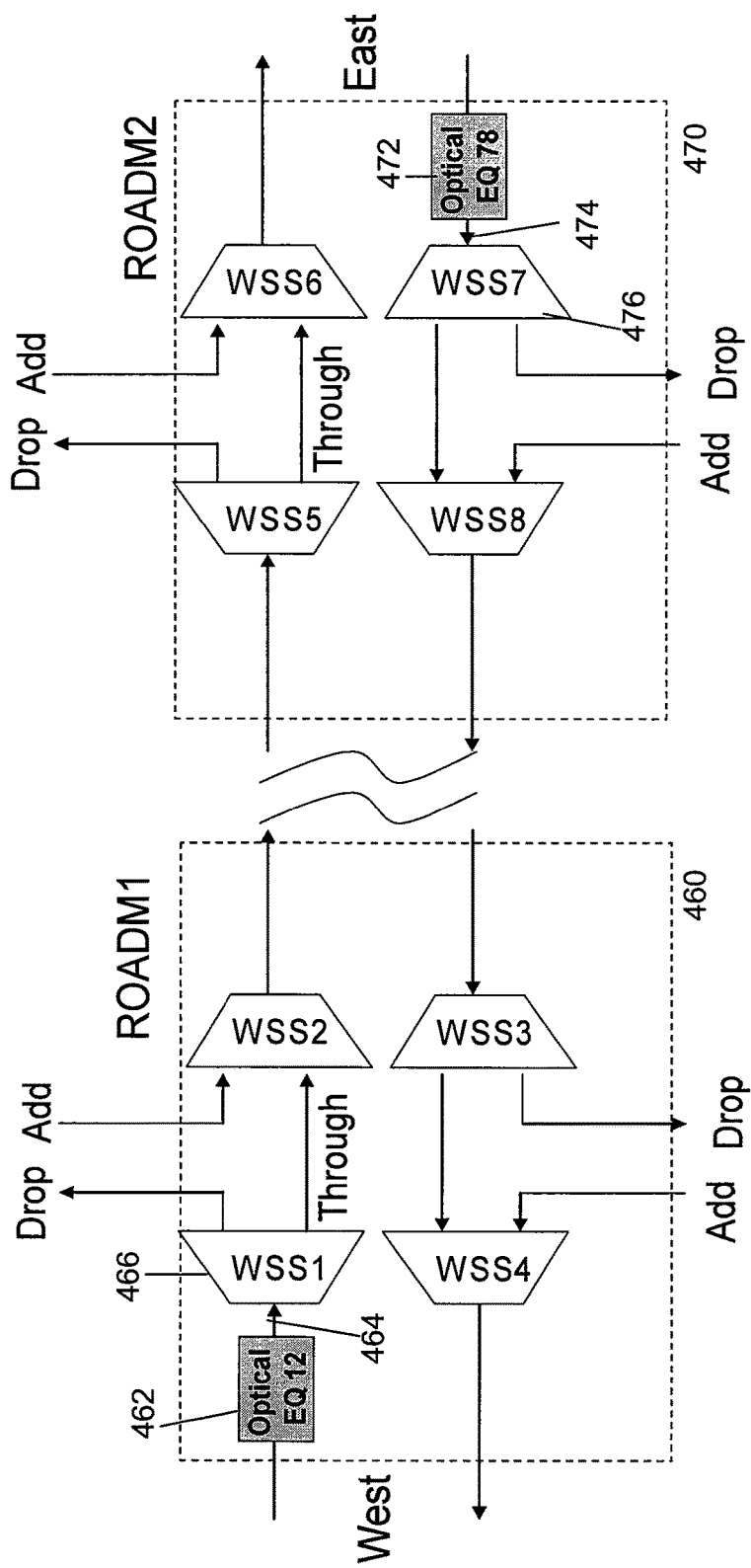
FIG. 4E illustrates exemplary ROADMs in a cascade arrangement, where an optical equalizer within a ROADM is used to compensate from the WSS filtering effects originating from more than one ROADM, in accordance with an embodiment of the present arrangement.

FIG. 4E illustrates exemplary ROADMS 460 and 470 in a cascade arrangement, each ROADM including an optical equalizer, in accordance with an embodiment of the present arrangement. ROADM 460 and ROADM 470 each utilizes a single optical equalizer in a propagation direction to compensate for optical filtering effects of more than one WSS. Optical equalizer 462 of ROADM 460, integrated at add port 464 of WSS 466 is configured to precompensate for optical filtering effects caused by WSS' in both ROADM 460 and ROADM 470 as ROADM 460 and ROADM 470 are connected in a cascade format. Likewise, optical equalizer 472 of ROADM 470, integrated at add port 474 of WSS 476 is configured to precompensate for optical filtering effects caused by WSS' in both ROADM 460 and ROADM 470 in a different propagation direction from optical equalizer 462. Thus, FIG. 4E provides an illustration of using a single optical equalizer in each propagation direction to compensate for optical filtering effects in more than one WSS located within different ROADMs.

Figure 5:
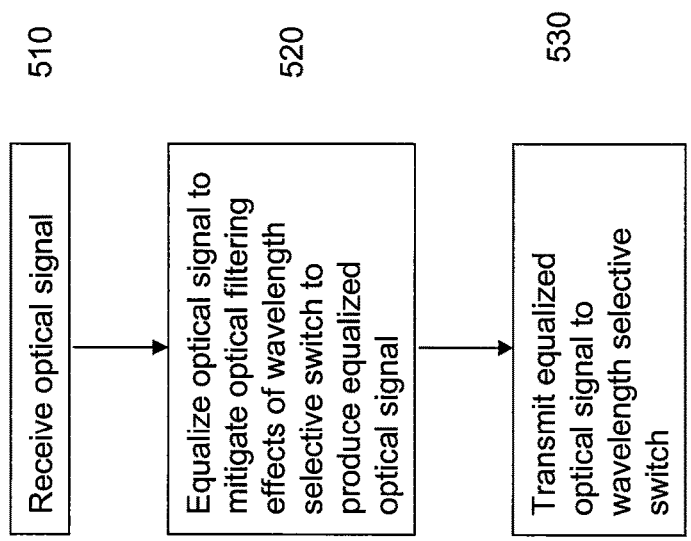
FIG. 5 illustrates an exemplary method for optical equalizer precompensation of optical filtering effects of a WSS, in accordance with an embodiment of the present arrangement.

FIG. 5 illustrates an exemplary method 500 for an optical equalizer precompensating for optical filtering effects of a wavelength selective device, such as a WSS, in accordance with an embodiment of the present disclosure. At step 510, an optical signal is received by the optical equalizer. For example, optical equalizer 406 receives an optical signal.

At step 520, the optical equalizer precompensates for optical filtering effects of the WSS. Precompensation is performed by equalizing the optical signal, which mitigates the optical filtering effects of the WSS, in order to produce an equalized optical signal. For example, optical equalizer 406 may equalize the received optical signal to produce an equalized optical signal in order to compensate for the optical filtering effects of WSS 402. Equalization of the optical signal may include adjusting a frequency strength of the optical signal as well as reducing noise degradation of the optical equalizer itself. Additionally, equalization of the optical signal may not only mitigate the optical filtering effects of just WSS 402, but also other WSS' within the same ROADM or on the same transmission link in a same propagation direction in a series of cascaded ROADMs on an optical network.

At step 530, the optical equalizer transmits the equalized optical signal to the WSS. For example, optical equalizer 406 transmits the equalized optical signal to WSS 402 through add port 404.

Figure 6:
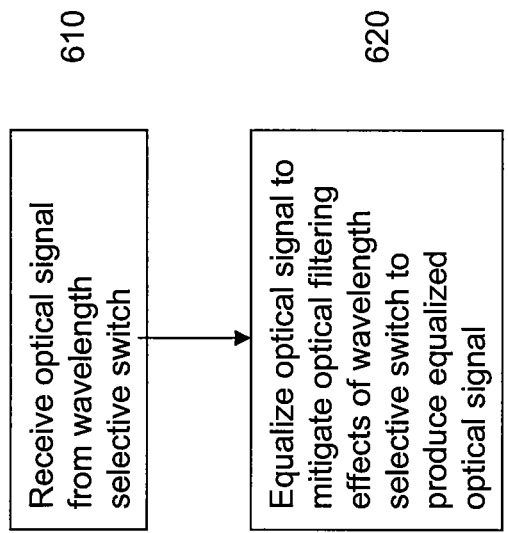
FIG. 6 illustrates an exemplary method for optical equalizer postcompensation of optical filtering effects of a WSS, in accordance with an embodiment of the present arrangement.

FIG. 6 illustrates an exemplary method 600 for an optical equalizer postcompensating for optical filtering effects of a wavelength selective device, such as a WSS, in accordance with an embodiment of the present disclosure. At step 610, an optical equalizer receives an optical signal from a WSS. For example, optical equalizer 416 receives an optical signal from drop port 414 of WSS 412.

At step 620, the optical signal is postcompensated for optical filtering effects of the WSS by the optical equalizer. Postcompensation is performed by equalizing the optical signal, which mitigates the optical filtering effects of the WSS in order to produce an equalized optical signal. For example, optical equalizer 416 equalizes the optical signal received from WSS 412 in order to compensate for the optical filtering effects of WSS 412. Equalization of the optical signal may include adjusting a frequency strength of the optical signal as well as reducing noise degradation of the optical equalizer itself. Additionally, equalization of the optical signal may not only mitigate the optical filtering effects of just WSS 402, but also other WSS' within the same ROADM or on the same transmission link in a same propagation direction in a series of cascaded ROADMs on an optical network.

It should be noted that the methods described herein may be used together with common transmitter-side pre-equalization techniques and/or receiver-side post-equalization techniques. The methods described herein may be used in order to compensate for first-order optical filtering effects while common transmitter-side pre-equalization techniques and/or receiver-side post-equalization techniques may be used to compensate for residual or high-order optical filtering effects.

The embodiments described herein for using optical equalizers integrated within ROADMs facilitates significant improvements to effective channel bandwidth. Theoretically, bandwidth may be utilized at a close to 100% bandwidth utilization rate as compared to current implementations of ROADMs which have a 50-70% bandwidth utilization rate. Additionally, there is no additional introduction of nonlinear penalty, or any significant noise enhancement. The achievable spectral efficiency may be improved, as well as single fiber capacity. This is particularly advantageous for long-haul and metropolitan optical networks where each optical wavelength of an optical signal must typically pass through multiple ROADMs. Cost per bit transmitted will be reduced and transport economics will be improved.

Figure 7A:
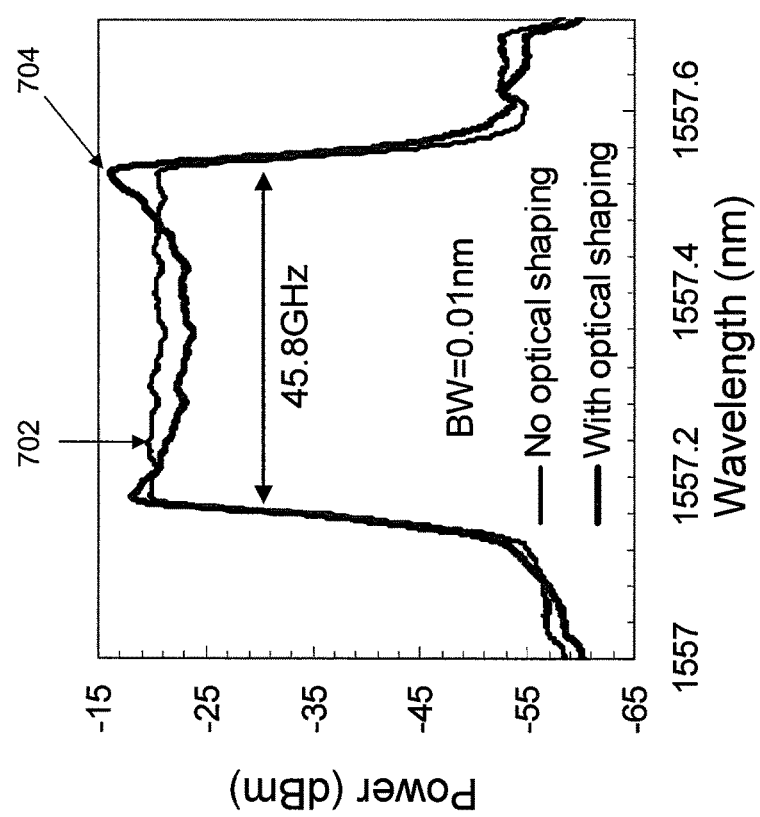
FIGS. 7A, 7B, and 7C illustrate measured optical spectra under different experimental conditions using an optical equalizer to compensate for filtering effects, in accordance with an embodiment of the present disclosure.
Figure 7B:
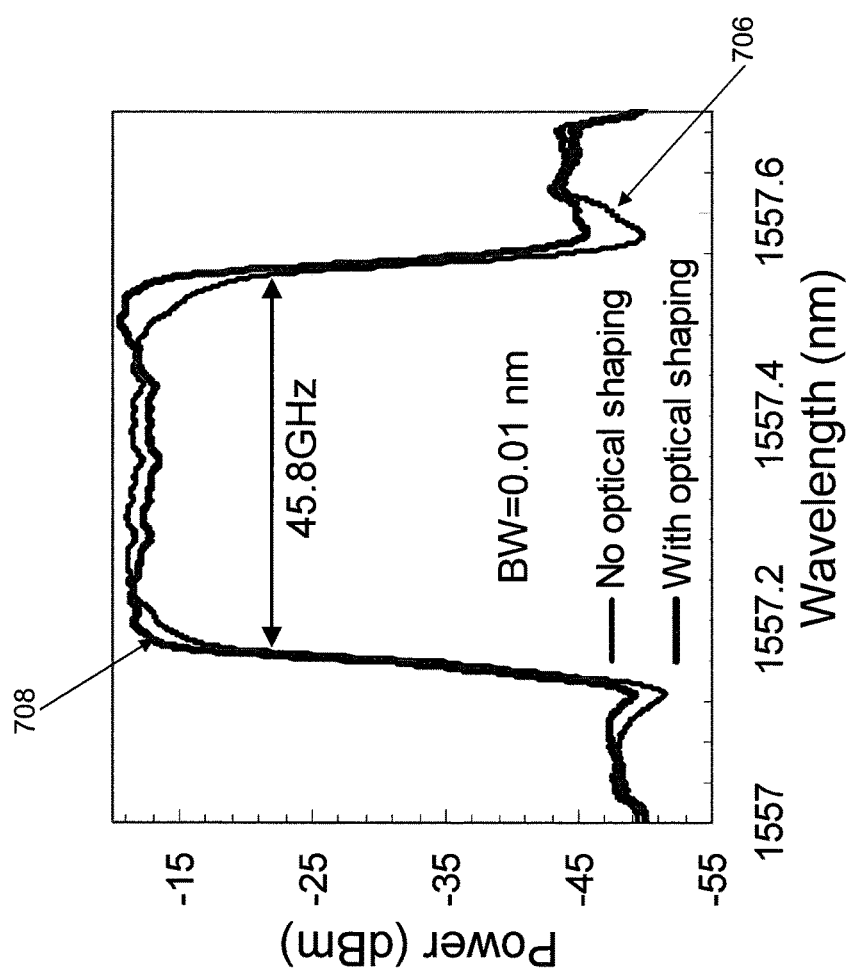
Figure 7C:
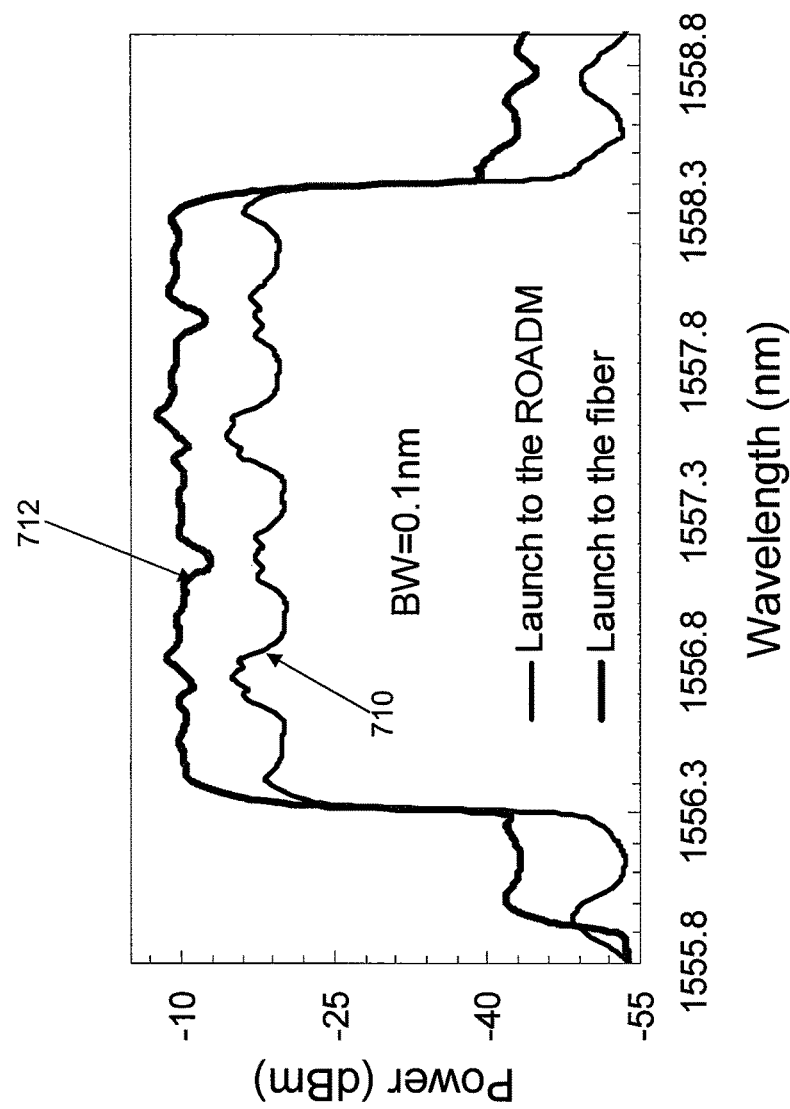

The effectiveness of using an optical equalizer to precompensate or postcompensate for filtering effects of WSS' in a ROADM has been verified by experiments using 5×450 Gb/s PM-32QAM WDM transmission equipment. FIGS. 7A, 7B, and 7C illustrate measured optical spectra under different experimental conditions using an optical equalizer to compensate for filtering effects, in accordance with an embodiment of the present disclosure. All experiments were conducted using a LCoS-based broadband optical equalizer to compensate for optical filtering effects from a 50 GHz-grid ROADM employing binary LC-based switching technology.

FIG. 7A illustrates a measured single channel optical signal 702 before entering a ROADM that is not compensated for optical filtering effects (i.e., a signal entering an exemplary ROADM without optical equalizers) as well as a measured single channel optical signal 704 that has been precompensated for optical filtering effects by an optical equalizer.

FIG. 7B illustrates a measured single channel signal 706 exiting a ROADM that is not compensated for optical filtering effects as well as a measured single channel optical signal 708 that has been postcompensated for optical filtering effects by an optical equalizer.

FIG. 7C illustrates a measured WDM signal 710 launched into a ROADM with a precompensation optical equalizer and a measured WDM signal 712 launched into an optical fiber including multiple ROADMs with precompensation optical equalizers.

Based on the experimental results, the narrow optical filtering effects caused by the WSS' within ROADMs can be compensated by using a LCoS based optical equalizer. For the specific experiments conducted to reach the results illustrated by FIGS. 7A, 7B, and 7C, more than 3 dB of OSNR sensitivity improvement was observed for the WDM channels using an optical equalizer.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method comprising:
receiving an optical signal at an optical equalizer;
equalizing a spectral shape of a signal of each channel of the optical signal by adjusting a frequency strength of each channel based on optical filtering effects caused by a first wavelength selective switch to mitigate the optical filtering effects and reduce noise degradation of the optical equalizer, the equalizing producing an equalized optical signal; and
transmitting the equalized optical signal to a sole input of the first wavelength selective switch.

2. The method of claim 1, wherein the equalizing the spectral shape of the signal of each channel of the optical signal further comprises:
mitigating distributed optical filtering effects of a plurality of wavelength routing devices along a transmission link.

3. The method of claim 2, wherein one of the plurality of wavelength routing devices comprises a second wavelength selective switch.

4. The method of claim 2, wherein the plurality of wavelength routing devices along the transmission link are downstream of the optical equalizer.

5. The method of claim 4, wherein the optical equalizer precompensates the optical signal based on the distributed optical filtering effects of the plurality of wavelength routing devices.

6. The method of claim 1, wherein the optical equalizer is a liquid crystal on silicon based optical equalizer having a loss of less than 7 dB.

7. The method of claim 1, wherein the equalizing the spectral shape of the signal of each channel of the optical signal is further based on optical filtering effects caused by wavelength routing devices upstream of the optical equalizer.

8. A reconfigurable optical add-drop multiplexer comprising:
a first wavelength selective switch having an input; and
an optical equalizer, coupled to the input of the first wavelength selective switch, to equalize a spectral shape of a signal of each channel of an optical signal by adjusting a frequency strength of each channel based on optical filtering effects caused by the first wavelength selective switch to mitigate the optical filtering effects and reduce noise degradation of the optical equalizer.

9. The reconfigurable optical add-drop multiplexer of claim 8, wherein the spectral shape of the signal of each channel of the optical signal is equalized by mitigating distributed optical filtering effects of a plurality of wavelength routing devices along a transmission link.

10. The reconfigurable optical add-drop multiplexer of claim 9, wherein one of the plurality of wavelength routing devices comprises a second wavelength selective switch.

11. The reconfigurable optical add-drop multiplexer of claim 9, wherein the plurality of wavelength routing devices along the transmission link are downstream of the optical equalizer.

12. The reconfigurable optical add-drop multiplexer of claim 11, wherein the optical equalizer precompensates the optical signal based on the distributed optical filtering effects of the plurality of wavelength routing devices.

13. The reconfigurable optical add-drop multiplexer of claim 8, wherein the optical equalizer is a liquid crystal on silicon based optical equalizer having a loss of less than 7 dB.

14. The reconfigurable optical add-drop multiplexer of claim 8, wherein the spectral shape of the signal of each channel of the optical signal is equalized by mitigating optical filtering effects caused by wavelength routing devices upstream of the optical equalizer.

15. A method comprising:
receiving an optical signal at an optical equalizer from a wavelength routing device;
equalizing a spectral shape of a signal of each channel of the optical signal by adjusting a frequency strength of each channel based on optical filtering effects caused by a first wavelength selective switch to mitigate the optical filtering effects and reduce noise degradation of the optical equalizer, the equalizing producing an equalized optical signal; and
transmitting the equalized optical signal to a sole input of the first wavelength selective switch.

16. The method of claim 15, wherein the equalizing the spectral shape of the signal of each channel of the optical signal further comprises:
mitigating distributed optical filtering effects of a plurality of wavelength routing devices along a transmission link.

17. The method of claim 16, wherein one of the plurality of wavelength routing devices comprises a second wavelength selective switch.

18. The method of claim 16, wherein the plurality of wavelength routing devices along the transmission link are downstream of the optical equalizer.

19. The method of claim 18, wherein the optical equalizer precompensates the optical signal based on the distributed optical filtering effects of the plurality of wavelength routing devices.

20. The method of claim 15, wherein the optical equalizer is a liquid crystal on silicon based optical equalizer having a loss of less than 7 dB.

* * * * *